(12) United States Patent
Jones et al.

(10) Patent No.: US 10,625,580 B1
(45) Date of Patent: Apr. 21, 2020

(54) SYSTEMS WITH ADJUSTABLE WINDOWS

(71) Applicant: Apple Inc., Cupertino, CA (US)

(72) Inventors: Christopher D. Jones, Los Gatos, CA (US); Ibuki Kamei, San Jose, CA (US); James R. Wilson, Cupertino, CA (US); Clarisse Mazuir, San Jose, CA (US); John Raff, Menlo Park, CA (US); Budhadipta Dan, San Jose, CA (US); David E. Kingman, Campbell, CA (US); Martin Melcher, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/651,889

(22) Filed: Jul. 17, 2017

Related U.S. Application Data

(60) Provisional application No. 62/380,136, filed on Aug. 26, 2016.

(51) Int. Cl.
*B60J 3/04* (2006.01)
*G02F 1/01* (2006.01)
*B60J 3/00* (2006.01)
*E06B 3/67* (2006.01)

(52) U.S. Cl.
CPC ............... *B60J 3/04* (2013.01); *B60J 3/007* (2013.01); *G02F 1/0121* (2013.01); *E06B 3/6722* (2013.01); *G02F 2203/01* (2013.01); *G02F 2203/02* (2013.01); *G02F 2203/03* (2013.01)

(58) Field of Classification Search
CPC .. G02F 2201/52; G02F 1/133514; G02F 1/19; G02F 2001/212; B82Y 20/00

USPC .......................................................... 359/259
See application file for complete search history.

(56) References Cited

U.S. PATENT DOCUMENTS

| | | | |
|---|---|---|---|
| 6,039,390 A | 3/2000 | Agrawal et al. | |
| 7,649,668 B2 | 1/2010 | Fanton et al. | |
| 7,916,380 B2 | 3/2011 | Tonar et al. | |
| 7,927,706 B2 | 4/2011 | Fisher | |
| 8,294,850 B2 | 10/2012 | Chen et al. | |
| 8,610,992 B2 | 12/2013 | Varaprasad et al. | |
| 2002/0036830 A1* | 3/2002 | Schofield | B60N 2/002 359/601 |
| 2004/0160538 A1 | 8/2004 | Li et al. | |
| 2004/0226223 A1* | 11/2004 | Lubaway | E05F 1/1091 49/349 |
| 2005/0068629 A1 | 3/2005 | Fernando et al. | |

(Continued)

*Primary Examiner* — Mohammed A Hasan
(74) *Attorney, Agent, or Firm* — Treyz Law Group, P.C.; G. Victor Treyz; Michael H. Lyons

(57) ABSTRACT

A system such as a vehicle may have adjustable structures such as adjustable windows. Adjustable windows may have adjustable layers such as adjustable tint layers, adjustable reflectivity layers, and adjustable haze layers. Adjustable window layers may be incorporated into a window with one or more transparent structural layers such as a pair of glass window layers. Adjustable components such as adjustable reflectivity layers, adjustable haze layers, and adjustable tint layers may be interposed between the pair of glass window layers. Fixed partially reflective mirrors, fixed tint layers, and/or fixed haze layers may be used in place of adjustable tint, haze, and reflectivity layers and/or may be incorporated into windows in addition to adjustable tint, haze, and reflectivity layers.

17 Claims, 7 Drawing Sheets

(56) References Cited

U.S. PATENT DOCUMENTS

| | | | |
|---|---|---|---|
| 2008/0297898 A1* | 12/2008 | Martin | G02B 27/0101 |
| | | | 359/490.01 |
| 2009/0027759 A1* | 1/2009 | Albahri | B60J 3/04 |
| | | | 359/277 |
| 2009/0268273 A1 | 10/2009 | Powers et al. | |
| 2010/0265583 A1 | 10/2010 | Martin | |
| 2011/0096253 A1 | 4/2011 | Zhang et al. | |
| 2015/0036204 A1* | 2/2015 | Branda | G02B 5/23 |
| | | | 359/244 |
| 2016/0291440 A1* | 10/2016 | Lenssen | G02F 1/167 |
| 2016/0306080 A1* | 10/2016 | Boyd | G02B 5/0242 |

* cited by examiner

| Tint | Reflection | Haze | Effect/Feature | Day (light out, dark inside) | | | | Night (dark out, light inside) | | | |
|---|---|---|---|---|---|---|---|---|---|---|---|
| | | | | Internal Appearance | See Out? | External Appearance | See In? | Internal Appearance | See Out? | External Appearance | See In? |
| ON | ON | OFF | 1-way mirror | Dark | YES | Mirror | NO | Dark/Reflect | NO | Shiny/Mirror | PARTIALLY |
| ON | OFF | OFF | Dark | Dark | YES | Dark | YES | Dark/Reflect | NO | Dark | YES |
| OFF | ON | OFF | Shiny | Shiny | YES | Shiny | YES | Mirror | NO | Shiny | YES |
| OFF | OFF | OFF | Clear | Clear | YES | Clear | YES | Reflect | PARTIALLY | Clear | YES |
| ON | ON | ON | Privacy Mirror | Hazy | NO | Mirror | NO | Dark/Reflect | NO | Shiny/Mirror | NO |
| ON | OFF | ON | Dark Privacy | Hazy | NO | Dark | NO | Dark/Reflect | NO | Dark | NO |
| OFF | ON | ON | 1/2 Privacy Mirror | Dark | NO | Mirror | NO | Dark/Reflect | NO | Shiny | NO |
| OFF | OFF | ON | Bright Privacy | Light | NO | Light | NO | Dark/Reflect | NO | Light | NO |

*FIG. 6*

SYSTEMS WITH ADJUSTABLE WINDOWS

This application claims the benefit of provisional patent application No. 62/380,136, filed on Aug. 26, 2016 which is hereby incorporated by reference herein in its entirety.

FIELD

This relates generally to structures that pass light, and, more particularly, to windows and other adjustable structures for systems such as vehicles and buildings.

BACKGROUND

It is desirable to provide vehicles and buildings with windows. Windows may be provided with frosted surfaces or mirror coatings to enhance privacy.

It can be challenging to incorporate light modifying structures such as frosted surfaces and mirror coatings into windows. If care is not taken, windows may be too reflective, may be insufficiently transparent for viewing, or may have other undesired attributes.

SUMMARY

A system such as a vehicle may have adjustable structures such as adjustable windows. Control circuitry in the vehicle may be used to adjust the adjustable windows based on user input and sensor input.

Adjustable windows may have adjustable layers such as adjustable tint layers, adjustable reflectivity layers, and adjustable haze layers. Adjustable window layers may be incorporated into a window with one or more transparent structural layers such as a pair of glass window layers. Adjustable components such as adjustable reflectivity layers, adjustable haze layers, and adjustable tint layers may be interposed between the pair of glass window layers. Fixed partially reflective mirrors, fixed tint layers, and/or fixed haze layers may be used in place of adjustable reflectivity, tint, and haze layers and/or may be incorporated into windows in addition to adjustable tint, haze, and reflectivity layers.

BRIEF DESCRIPTION OF THE DRAWINGS

FIG. 6 is a table showing how a window may be configured to operate in a variety of different modes in accordance with an embodiment.

DETAILED DESCRIPTION

A vehicle or other system may have structures formed from one or more layers of glass, polymer, conductive material (e.g., transparent conductive material such as indium tin oxide), crystalline materials (e.g., sapphire), and/or other materials. The structures may include opaque layers and/or transparent layers (e.g., transparent glass and polymer layers, etc.).

The structures may include one or more adjustable layers such as adjustable tint layers, adjustable haze layers, and adjustable reflectivity layers. By suitable configuration of fixed and/or adjustable layers, windows in vehicles and other systems may be provided with desired attributes (e.g., a desired outward appearance such as a desired reflectivity, a desired light transmittance, a desired interior privacy level, etc.).

Figure 1:
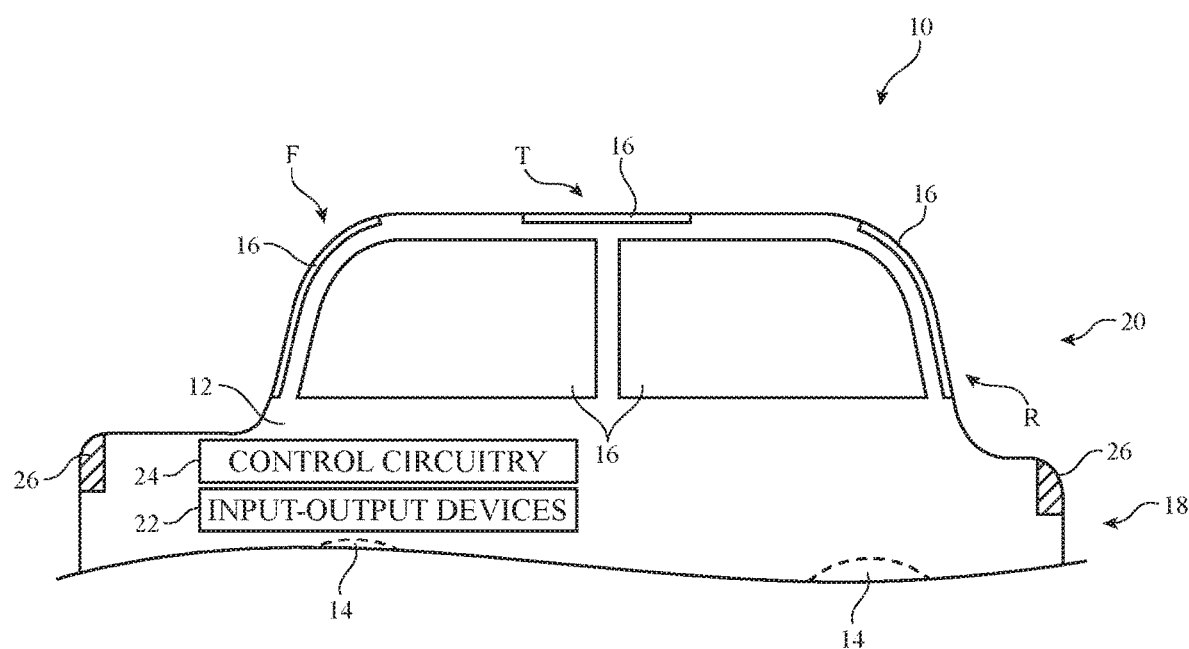
FIG. 1 is a schematic diagram of an illustrative system in accordance with an embodiment.

An illustrative system with windows is shown in FIG. 1. As shown in FIG. 1, system 10 may be a vehicle having portions such as portions 18 and 20. Portion 18 may include wheels 14, a body such as body 12 with a chassis to which wheels 14 are mounted, propulsion and steering systems, and other vehicle systems. Body 12 may include doors, trunk structures, a hood, side body panels, a roof, and/or other body structures. Seats may be formed in the interior of vehicle 10. Portion 20 may include windows such as window(s) 16. Window 16 and portions of body 12 may separate the interior of vehicle 10 from the exterior environment that is surrounding vehicle 10.

Windows 16 may include front windows on front F of vehicle 10, a moon roof window or other window extending over some or all of top T of vehicle 10, rear windows on rear R of vehicle 10, and side windows on the sides of vehicle 10 between front F and rear R. If desired, structures with adjustable tint, haze, and/or reflectivity may be used in forming laminated glass structures and other structures that serve as exterior lighting components (e.g., front and rear lights 26, center high mounted stop lamps, running lights, etc.).

Window 16 may be formed from one or more layers of transparent glass, clear polymer (e.g., polycarbonate), polymer adhesive layers, and/or other layers. In some arrangements, window(s) 16 may include laminated window structures such as one or more layers of glass with interposed polymer layer(s). The polymer in a laminated window may be, for example, a polymer such as polyvinyl butyral (PVB) or ethylene-vinyl acetate (EVA). Adjustable layers in window 16 may, if desired, be embedded in a polymer layer such as a PVB or EVA layer that is interposed between outer and inner glass layers.

Vehicle 10 may include control circuitry 24 and input-output devices 22. Control circuitry 24 may include storage and processing circuitry for supporting the operation of vehicle 10. The storage and processing circuitry may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 24 may be used to control the operation of vehicle 10 and the components in vehicle 10 (e.g., components associated with windows 16, lights 26, input-output devices 22, etc.). For example, processing circuitry can adjust the haze, tint (light transmission), and/or reflectivity of one or more layers in windows 16 and may make adjustments to other input-output devices 22, and/or may make other adjustments to components such as windows 16, lights 26, etc. The processing circuitry may be based on one or more microprocessors, microcontrollers, digital signal processors, baseband processors, power management units, audio chips, application specific integrated circuits, etc.

Input-output devices 22 may allow data to be supplied to vehicle 10 and to a user and may allow data to be provided from vehicle 10 to external systems or a user. Input-output devices 22 may include buttons, scrolling wheels, touch pads, key pads, keyboards, and other user input devices. Microphones may be used to gather voice input from a user and may gather information on ambient sounds. Devices 22 may include ambient light sensors, proximity sensors, magnetic sensors, force sensors, accelerometers, image sensors, and/or other sensors for gathering input. Output may be supplied by devices 22 using audio speakers, tone generators, vibrators, haptic devices, displays, light-emitting diodes and other light sources, and other output components. Devices 22 may include wired and wireless communications circuitry that allows vehicle 10 (e.g., control circuitry 24) to communicate with external equipment and that allows signals to be conveyed between components (circuitry) at different locations in vehicle 10. Light modulators, adjustable reflectivity structures, and/or adjustable haze structures for windows 16 may be included in devices 22.

During operation, input from devices 22 (e.g., user input, ambient light sensor measurements such as measurements on exterior light levels, interior light level measurements or other interior light level information, and/or other input from devices 22) may be used by control circuitry 24 in making adjustments to interior lighting and to the light transmission, reflectivity, and/or haze of windows 16. For example, control circuitry 24 can adjust windows 16 to enhance privacy, to change the appearance of windows 16 from the interior and/or exterior of vehicle 10, and/or to change the amount of light transmission through windows 16. Control circuitry 24 may make these adjustments automatically based on sensor input, based on user commands, and/or based on other information.

Figure 2:
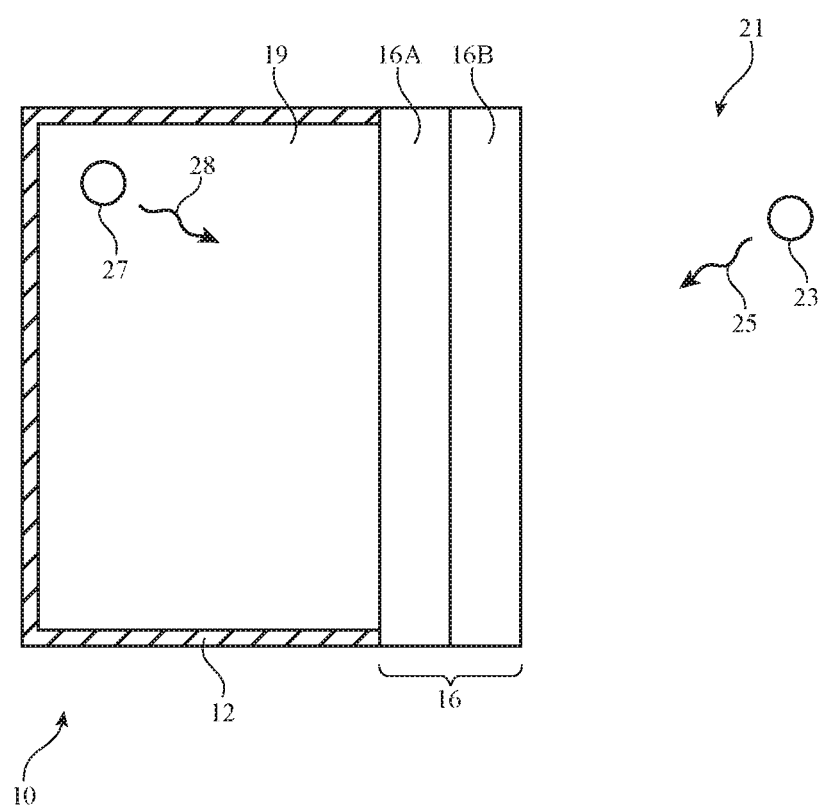
FIG. 2 is a diagram showing how a window may have layers that modify light propagation in accordance with an embodiment.

In some configurations, one or more layers of windows 16 may be use to create a one-way mirror effect for vehicle 10. Consider, as an example, a scenario of the type shown in FIG. 2. In the example of FIG. 2, window 16 includes at least first (inner) window layer 16A and second (outer) window layer 16B. Window 16 may be mounted in body 12 of vehicle 10. Vehicle 10 may have an interior region such interior 19 and an exterior region such as region 21. Window 16 may separate interior 19 from exterior 21. Layers such as layers 16A and 16 may have optical properties (e.g., transmission and/or reflectivity) that can be adjusted to adjust the behavior of window 16 in a variety of lighting conditions.

Layers 16A and 16B may be, for example, layers with fixed and/or adjustable levels of tint (i.e., light absorption and therefore light transmission) and reflectivity. With one illustrative arrangement, layer 16A is an adjustable tint layer (sometimes referred to as a light modulator or adjustable absorption layer) and layer 16B is an adjustable reflectivity layer. Configurations in which one or both of these layers are not adjustable and/or in which additional layers with fixed and/or adjustable properties (e.g., adjustable haze, etc.) may also be used. The arrangement in which layer 16A is an adjustable tint layer and in which layer 16B is an adjustable reflective layer is merely illustrative.

Using an adjustable tint layer (layer 16A) and adjustable reflectivity layer (layer 16B), users of vehicle 10 may make adjustments that increase or decrease privacy. For example, vehicle occupants in vehicle 10 may increase the reflectivity of layer 16B when it is desired to reflect more exterior light back towards observers outside of vehicle 10. When layer 16B exhibits low reflectivity, privacy is minimize and external observers may be able to view vehicle occupants through window 16. When layer 16B exhibits high reflectivity, privacy is maximized. In this situation, layer 16B reflects external light towards observers outside of vehicle 10, window 16 exhibits a one-way mirror behavior, and external observers cannot easily view the interior of vehicle 10.

In addition to adjusting privacy by making automatic or user-specified adjustments to the reflectivity of layer 16B, it may be desirable to adjust the light transmission properties of window 16 by adjusting the amount of light absorption exhibited by adjustable tint layer 16A. If a vehicle occupant wishes to view the surroundings of vehicle 10 clearly, tint may be minimized to maximize light transmission through window 16. If a vehicle occupant wishes to reduce the amount of exterior lighting that enters vehicle 10 (e.g., to cut down on bright light during the day), the tint level of layer 16A may be increased.

Tint level adjustments can affect privacy in windows that include a reflective layer such as adjustable reflectivity layer 16B.

Consider, as an example, a scenario in which layer 16B exhibits a 50% light reflectivity and in which layer 16A is adjusted to operate in three different light absorption modes: a low absorption mode in which layer 16A exhibits a low absorption such as 0% absorption, a moderate absorption mode in which layer 16A exhibits a moderate absorption such as a 50% absorption, and a high absorption mode in which layer 16A exhibits a high absorption such as a 80% absorption. In this illustrative scenario, the internal light level (i.e., the amount of light 28 generated by internal lighting 27 in interior 19 of vehicle 10) may have a value of 20 (in arbitrary light intensity units), whereas the external light level (i.e., the amount of light 25 generated by external light source 23 in exterior region 21) may have a value of 100 (in the same arbitrary light intensity units). In the low absorption mode, an external observer will observe 50 light intensity units due to reflection of the outside lighting from reflective layer 16B and will observe 10 light intensity units due to interior light that has transmitted through window 16 (i.e., the 20 interior light intensity units will be reduced by a factor of two due to the 50% light transmission of layer 16B). The low absorption mode will therefore be characterized by a ratio of 5:1 for the amount of external light that is reflected from window 16 relative to the amount of internal light that passes through window 16. In the moderate and high absorption modes, this ratio is respectively 10:1 and 25:1 due to the absorption of layer 16A. Higher ratios of reflected external light to transmitted interior light are associated with a greater one-way mirror effect and therefore enhanced privacy.

The same type of behavior (privacy enhancement with increasing tint level) holds in lighting scenarios in which interior light levels are closer to exterior light levels. For example, consider another possible scenario in which exterior light is characterized by a value of 100 light intensity units and in which interior light is characterized by a value of 100 light intensity units. In an illustrative configuration in which adjustable reflectivity layer 16B is set to exhibit 50% reflectivity, tint layer 16A may again be adjusted between the low, moderate, and high light absorption modes. Window 16 may then exhibit a 1:1 outside reflected light to interior transmitted light ratio for the low absorption mode, a 2:1 ratio for the moderate absorption mode, and a 5:1 ratio for the high absorption mode. Although there is less privacy in this lighting scenario, the addition of tint still enhances privacy by increasing the ratio of reflected exterior light to transmitted interior light.

In yet another lighting scenario, exterior light may be characterized by a value of 50 light intensity units and interior light may be characterized by a value of 100 light intensity units. Adjustable reflectivity layer 16B may be set to exhibit 50% reflectivity. Tint layer 16A may be adjusted between the low, moderate, and high light absorption modes. Window 16 may then exhibit a 1:2 outside reflected light to interior transmitted light ratio for the low absorption mode, a 1:1 ratio for the moderate absorption mode, and a 2.5:1 ratio for the high absorption mode. Because the outside light level is lower than the interior light level in this scenario, it may desirable to use the highest tint level to ensure privacy.

As these examples demonstrate, adjustments to the tint level of layer 16A affect not only light transmission level (i.e., how dark window 16 appears to a vehicle occupant), but how much privacy is provided. By independently adjusting tint and reflection, the outward appearance of window 16 can be adjusted (from more shiny when layer 16B is more reflective to less shiny when layer 16A is less reflective), privacy can be adjusted (from more private when layer 16B is more reflective and/or tint layer 16A is more absorbing and less transmissive), and window transmission can be adjusted (from lower when tint and/or reflectivity levels are high to higher when tint and/or reflectivity levels are lower).

Figure 3:
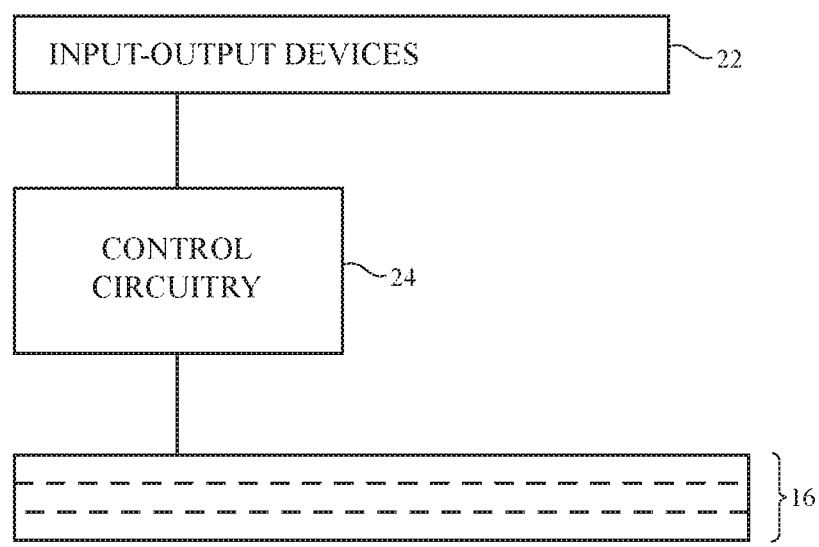
FIG. 3 is a diagram of illustrative components in a system with a window in accordance with an embodiment.

If desired, window 16 may have one or more additional layers such as an adjustable haze layer to provide further adjustability to the optical properties of window 16. These properties may be adjusted based on user input and/or input from sensors or other input-output devices 22. As shown in FIG. 3, control circuitry 24 may be coupled to input-output devices 22 and window 16. Window 16 may include one or more layers that have been laminated together or otherwise stacked together. These layers may affect tinting, reflectivity, haze, and/or other optical characteristics and may be adjusted by control circuitry 24 based on user input received using user input devices in input-output devices 22 (e.g., a keyboard, a touch screen, a microphone gathering voice input, buttons, a wireless link from a coupled portable electronic device or other wireless device, etc.) and/or based on measured interior and/or exterior lighting levels (e.g., an exterior light level measured by an ambient light sensor in devices 22, an interior light level determined based on known interior lighting level settings and/or measured interior light levels) or based on other data gathered using input-output devices 22. Adjustments that are made by control circuitry 24 to the adjustable components of window 16 may be made periodically (e.g., once per minute), may be made in response to receiving user input, may be made in response to changes in the operating environment of vehicle 10 (e.g., changes in ambient lighting conditions), or may be made when other suitable criteria are satisfied.

Figure 4:
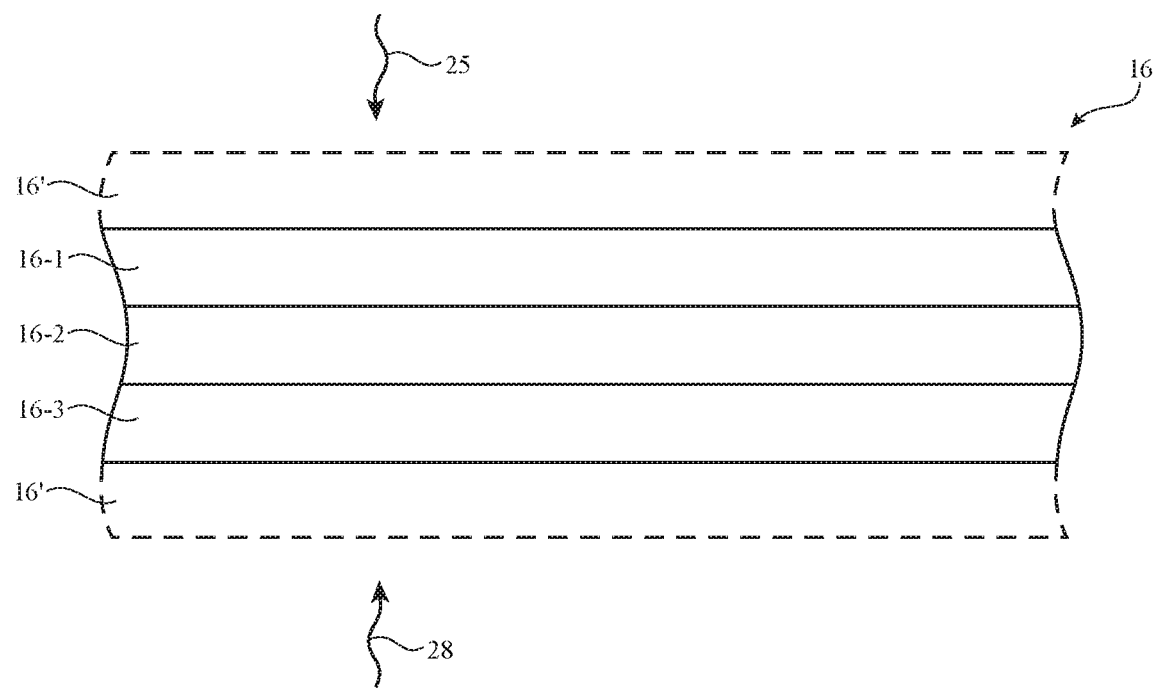
FIG. 4 is a cross-sectional side view of an illustrative window having multiple layers in accordance with an embodiment.

A cross-sectional side view of window 16 in an illustrative configuration in which window 16 has at least three adjustable layers is shown in FIG. 4. As shown in FIG. 4, window 16 may have outer and inner layers such as optional layers 16'. Layers 16' may be formed from glass, rigid plastic (e.g., polycarbonate, etc.) and/or other materials. Layers 16' may be clear and/or may be tinted. Layers 16' may be laminated together using one or more interposed layers of adhesive (e.g., PVB, EVA, etc.).

One or more adjustable layers such as layers 16-1, 16-2, and 16-3 may be interposed between outer and inner layers 16' (e.g., layers such as layers 16-1, 16-2, and 16-3 may be laminated between glass layers or other layers 16' using PVB, EVA, and/or other adhesive). One or more structural layers such as layers 16' may be omitted in configurations for window 16 in which structural support is provided by other layers (e.g., when layers 16-1, 16-2, and/or 16-3 include glass and/or plastic layers that provide window 16 with structural support). Layers 16-1, 16-2, and/or 16-3 may include adjustable components such as an adjustable tint layer, an adjustable reflectivity layer, and/or an adjustable haze layer. In some configurations, the functions of two or more of these layers may be combined into a single component. For example, a component may exhibit both adjustable haze and adjustable tint.

If desired, layers such as layers 16-1, 16-2, and 16-3 may be formed as coatings. For example, one or more of these layers may be formed as a coating on an inner surface of an exterior layer 16' or as a coating on an outwardly facing surface of an inner layer 16'. As another example, one or more of layers 16-1, 16-2, and 16-3 may be formed as a coating on another of layers 16-1, 16-2, and 16-3. For example, layer 16-2 may be an adjustable haze layer and layer 16-1 may be a thin-film metal coating on layer 16-2 (e.g., a coating on a glass or plastic substrate in layer 16-2) that serves as a partially reflective mirror coating for window 16. Additional structural and/or functional layers (e.g., antireflection coating layers, fixed reflectivity partial mirror coatings, fixed tint coatings, and/or fixed haze layers, anti-scratch layers, etc.) may be incorporated into window 16 if desired. The configuration of FIG. 4 is merely illustrative.

In a configuration with multiple adjustable layers such as layers 16-1, 16-2, and 16-3, layer 16-1 may, as an example, be an outwardly facing layer that receives exterior light 25. Exterior light 25 that has passed through layer 16-1 may then pass through the other layers of window 16 (e.g., layers 16-2 and 16-3). Layer 16-3 may be an inwardly facing layer that receives interior light 28. Interior light 28 that has passed through layer 16-3 may then pass through layers 16-2 and 16-1.

With one illustrative configuration, layer 16-1 is an adjustable reflectively layer, layer 16-2 is an adjustable haze layer, and layer 16-3 is an adjustable tint layer (i.e., a light modulator). If desired, the positions of any two of these layers may be swapped. As an example, layer 16-2 may be an adjustable tint layer and layer 16-3 may be an adjustable haze layer. Structural layers and/or other adjustable component layers may be interposed between these layers, if desired. Arrangements in which layer 16-3 provides adjustable tint, layer 16-2 provides adjustable haze, and layer 16-1 provides adjustable reflectivity may sometimes be described herein as an example.

Any suitable adjustable components may be used in forming layers 16-1, 16-2, and 16-3. As one example, adjustable reflectivity layer 16-3 may be an adjustable reflectivity component such as a cholesteric liquid crystal layer. A cholesteric liquid crystal device may exhibit a mirror reflectivity that is adjustable. When used in layer 16-3, the cholesteric liquid crystal device may be characterized by an "on" state and an "off" state. In the "on" state (e.g., when control circuitry 24 applies a voltage to layer 16-3), the cholesteric liquid crystal device may be transparent. The transmission of the cholesteric liquid crystal device may be adjusted by adjusting the applied voltage (i.e., layer 16-3 may serve both as an adjustable reflectivity layer and as an adjustable tint layer). In the "off" state, the cholesteric liquid crystal device may act as a partial mirror and may reflect more than 50% of incident light, more than 70% of incident light, less than 99% of incident light, or other suitable amount of incident light.

Cholesteric liquid crystal layers may exhibit relatively fast switching speeds, low haze (e.g., haze values of less than 5%), and good reflectivity (e.g., when "off"). If desired, adjustable reflectivity layers such as layer 16-1 may be implemented using other types of adjustable mirror components. For example, an adjustable reflectivity component for layer 16-1 may be formed from a solid-state switching mirror component based on a switchable metal hydride film (e.g., layer 16-1 may be an adjustable magnesium hydride mirror).

If desired, an adjustable reflectivity layer such as a cholesteric liquid crystal layer or switchable metal hydride film may be embedded within a PVB layer or other adhesive layer that is sandwiched between a pair of laminated glass layers (e.g., glass window layers that are being joined by the PVB layer to form a laminated window).

Adjustable tint layer 16-3 may be formed form a light modulator component such as an electrochromic device, guest-host liquid crystal device, or a suspended particle device (as examples). Other types of adjustable components may be used in implementing adjustable tint layer 16-3, if desired.

An electrochromic device may have a pair of transparent electrodes. An electrolyte such as LiNiOP (e.g., a gel electrolyte) may be interposed between electrochromic coatings on the electrodes. The electrochromic coatings may be, for example, a $Li_xNiO$ coating on a first of the electrodes and a $WO_3$ coating on a second of the electrodes. The electrodes may be used to apply a current to the electrochromic coatings to either darken (color) or lighten (discolor) layer 16-3. Electrochromic devices may exhibit low haze (e.g., less than 5%) and may maintain their current state in the event of a failure. If desired, layer 16-3 may be implemented using a solid state electrochromic device in which solid organic or inorganic material is used to form the electrochromic electrolyte.

A guest-host liquid crystal device may include a light-absorbing dye "guest" in a liquid crystal "host" layer. These materials may form a layer that is sandwiched between a pair of transparent electrodes. When an electric field is applied to the guest-host layer, the liquid crystals rotate, thereby rotating the guest dye into an orientation that enhances light absorption. When the electric field is removed, the guest dye molecules are no longer held in the high-absorption orientation so that layer 16-3 becomes transparent.

Layer 16-3 may also be implemented using a suspended particle device. A suspended particle device contains a layer of nanoparticles suspended in a liquid that is sandwiched between substrate layers with transparent conductive electrodes. In the absence of an applied electric field, the nanoparticles are randomly oriented and absorb light (i.e., the tint of layer 16-3 is dark). When an electric field is applied, the nanoparticles align and allow light to pass (i.e., the tint of layer 16-3 is clear). In addition to allowing an adjustable tint to be obtained, suspended particle devices are characterized by an associated adjustable haze (e.g., a 6% haze when the suspended particle device is off and is exhibiting a low amount of light absorption and a 50% haze when the suspended particle device is on and is exhibiting a high amount of light absorption). In this way, a suspended particle device may serve both as an adjustable tint layer (layer 16-3) and as an adjustable haze layer (layer 16-2).

If desired, haze may be adjusted independently using an adjustable haze layer such as layer 16-2. Layer 16-2 may be implemented using a polymer-dispersed liquid crystal device. In this type of device, a polymer layer having voids filled with liquid crystal material may be sandwiched between conductive transparent electrodes on respective first and second transparent substrates. When no electric field is applied to the electrodes, the liquid crystals in the voids are randomly oriented and exhibit an index-of-refraction difference with the surrounding polymer layer. This causes the liquid crystal material of the voids to produce a relatively large amount of haze that scatters light that is passing through layer 16-2. When electric field is applied to the electrodes by control circuitry 24, the liquid crystals of the liquid crystal material in the voids becomes aligned so that the liquid crystal material in the voids exhibits an index of refraction that matches the surrounding polymer. In this configuration, layer 16-2 exhibits low haze and high transparency. Intermediate haze levels may be achieved by applying an electric field at an intermediate level.

If desired, one or more of layers 16-1, 16-2, and 16-3 (and, if desired, layers such as glass layers 16' of FIG. 4) may be implemented using fixed reflectivity layers (e.g., thin reflective metal coatings, thin reflective dielectric stack coatings, etc.), fixed tint (e.g., glass or polymer that has been darkened by incorporation of light-absorbing particles, dye, metal coating material, etc.), and/or fixed haze (e.g., by incorporating a textured polymer or glass layer, a hazy layer formed from microbubbles or light-scattering particles in a glass or plastic material, etc.). The use of adjustable layers in providing window 16 with adjustable tint, haze, and reflectivity is merely illustrative.

Figure 5:
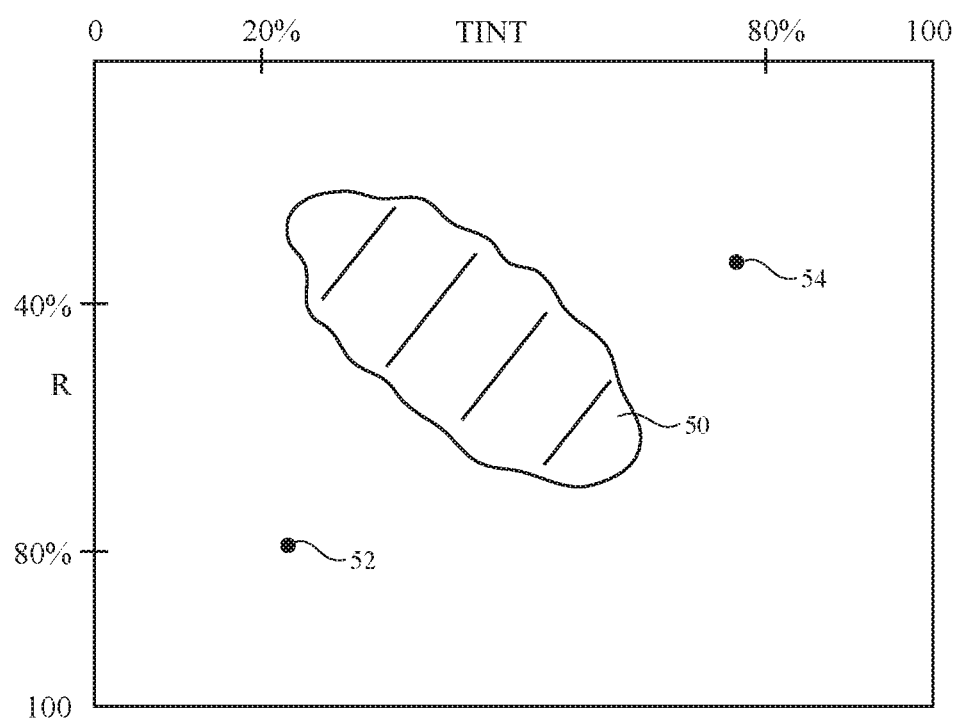
FIG. 5 is graph showing how variations in the properties of window layers of the type shown in FIG. 4 may affect window performance in accordance with an embodiment.

The use of independently adjustable tint and reflectivity to provide window 16 with different configurations is shown in FIG. 5. In the example of FIG. 5, the amount of light absorption (TINT) of an adjustable tint layer in window 16 has been plotted on the horizontal axis and the amount of light reflection (R) for an adjustable reflectivity layer has been plotted vertically for an illustrative window having an adjustable tint layer and an adjustable reflectivity layer. In regions of the graph of FIG. 5 such as region 50, the adjustable tint layer and the adjustable reflectivity layer have been provided with intermediate values and window 16 may exhibit a one-way mirror behavior. When, as illustrated by point 52 on the graph of FIG. 5, the tint and reflectivity layers have been adjusted to exhibit a relatively high reflectivity (e.g., R=80%) and a relatively low tint (e.g., TINT=20%), window 16 may exhibit a relatively high amount of privacy. For example, the ratio of reflected external light to internal light that is transmitted through window 16 (sometimes referred to as the "privacy factor" of window 16) may be about 10 in an illustrative operating scenario in which outside light has an intensity of 100 light intensity units and in which interior light has an intensity of 50 light intensity units. When, as illustrated by point 54 on the graph of FIG. 5, the tint and reflectivity layers have been adjusted to exhibit a moderate reflectivity (e.g., R=40%) and a relatively high tint (e.g., TINT=85%) under the same lighting conditions, window 16 may continue to exhibit the same ratio of reflected external light to transmitted internal light (i.e., the privacy factor may still be 10 in this example).

Window 16 may therefore exhibit the same amount of privacy whether configured to operate with the settings of point 52 or the settings of point 54. When operated with the settings of point 52, however, window 16 may be very shiny when viewed from the exterior of vehicle 10, whereas window 16 may exhibit relatively low reflectivity when operated with the settings of point 54. Moreover, the total transmission of window 16 (i.e., the amount of exterior light that an internal viewer can observe through window 16) will be 15% when operated with the settings of point 52 and only 8% when operated with the settings of point 54. As this example demonstrates, window 16 may be configured to adjust its outward appearance and/or to adjust the light transmission of window 16 to accommodate user preferences for appearance and/or light transmission while continuing to maintain a desired privacy level. Other types of adjustments may also be made (e.g., to adjust privacy while maintaining a desired light transmission setting, etc.).

In configurations for window 16 that include adjustable haze, additional adjustments to window 16 may be made. Haze provides windows 16 with a milky appearance and enhances privacy. Regardless of the relative values of interior and exterior light levels, increased haze will provide enhanced privacy by preventing exterior observers from viewing interior vehicle occupants through window 16.

FIG. 6 is a table in which illustrative window settings and associated optical properties have been listed for a window with adjustable tint, haze, and reflectivity. Illustrative combinations of high tint ("on"), low tint ("off"), high reflectivity ("on"), low reflectivity ("off"), high haze ("on"), and low haze ("off") with which window 16 may be provided using adjustable components such adjustable tint layer 16-3, adjustable haze layer 16-2, and adjustable reflectivity layer 16-1 are shown in columns 60. If desired, some of these attributes may be provided using components that provide fixed tint, haze, and/or reflectivity and/or using fewer components or more components to produce adjustable amounts of tint, haze, and/or reflectivity) Each row of the table of FIG. 6 has a different associated combination of tint, reflectivity (reflection), and haze. Each row of column 62 lists a different overall effect that is produced by the combination of settings associated with that row. Columns 64 and columns 66 detail the internal appearance, external appearance, and ability to see in and out of vehicle 10 through window 10 that are associated with each combination of settings. Columns 64 are associated with the operation of window 16 when the ambient environment of vehicle 10 is bright and the interior of vehicle 10 is dark. Columns 66 are associated with the operation of window 16 when the ambient environment of vehicle 10 is dark and the interior of vehicle 10 is light.

If desired, other combinations of adjustable layers may be provided in window 16, any of the adjustable layers may be replaced by a fixed layer (e.g. a fixed tint, haze, and/or reflectivity) to reduce window complexity, and/or other fixed and/or adjustable layers may be incorporated in window 16. Adjustments to the components of window 16 may, as illustrated in FIG. 6, be used to increase or decrease privacy, may be used to alter the outward appearance of window 16 (e.g., to make window 16 more or less reflectivity), may be used to alter light transmission (e.g., so that the occupants of vehicle 10 can view out of window 16 with minimal light intensity reduction or with a strong light intensity reduction, etc.

In addition to or instead of using adjustable components such as adjustable layers 16-1, 16-2, and 16-3 in windows 16, some or all of these layers may be used in adjusting the performance and appearance of other devices in vehicle 10 such as exterior lights 26, a dashboard or other device that includes a display (e.g., a display that is laminated with layers 16-1, 16-2, and/or 16-3), components in a building or other system other than a vehicle, etc. Windows 16 and other components in a system such as vehicle 10 may be adjusted in real time based on user input, based on sensor readings, and/or based on other suitable criteria. During operation, control circuitry 24 can adjust each window 16 in vehicle 10 separately. For example, control circuitry 24 may adjust the tint or other window settings of a vehicle differently for the windows on different sides of vehicle 10 in response to user commands or sensor input. If desired, ultraviolet-light-blocking filter layers, infrared-light-blocking filter layers, and/or other filter layers may be incorporated into windows 16.

Figure 7:
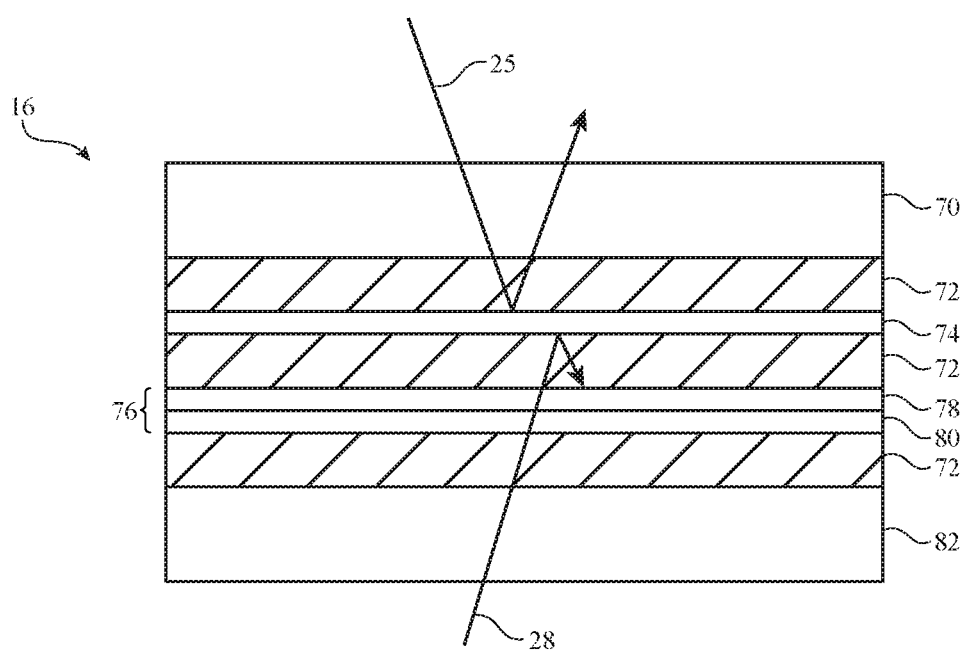
FIG. 7 is a cross-sectional side view of an illustrative window having a reflective layer and a circular polarizer in accordance with an embodiment.

If desired, windows 16 may include polarizers. Consider, as an example, window 16 of FIG. 7. Window 16 may have structural window layers such as outer structural layer 70 and inner structural layer 82. Layers 70 and 82 may be formed from clear plastic, transparent glass, or other structural window materials. In the example of FIG. 7, window 16 has an outer layer 70 such as outer glass layer and an inner layer 82 such as an inner glass layer. More structural window layers or fewer structural window layers may be included in window 16 if desired.

The layers of window 16 may include layers that are separated by air gaps and/or may include layers that are laminated together using interposed layers of adhesive. For example, a polymer adhesive layer such as layer 72 may be used in coupling layers 70 and 82 together. One or more additional layers such as layers 74 and 76 (e.g., fixed and/or adjustable reflectivity layers, fixed and/or adjustable haze layers, fixed and/or adjustable tint layers, polarizers, etc.) may be embedded within layer 72. Layer 72 may be, for example, a polymer layer such as a layer of polyvinyl butyral (PVB) or ethylene-vinyl acetate (EVA).

In the illustrative configuration of FIG. 7, layer 74 is a fixed or adjustable reflectivity layer and layer 76 is a polarizer layer. Window polarizer layers such as layer 76 may be linear polarizers or circular polarizers (as examples). Circular polarizers (e.g., circular polarizers with vertically polarized linear polarizer layers) and vertically polarized linear polarizers may enhance the ability of sunglass-wearing occupants to view exterior objects through window 16. In the FIG. 7 example, layer 76 is a circular polarizer layer having linear polarizer layer 80 and quarter wave plate 78. Polarizer 76 and layer 74 may be embedded within layer 72 and/or polarizer 76 may be formed as a coating on layer 72. Configurations in which layers such as layers 74 and/or 76 are formed as coatings on layers 70 and/or 82 may also be used.

When the exterior of vehicle 10 is relatively bright, reflective layer 74 may enhance privacy for vehicle 10 by reflecting most of exterior light 25, as shown in FIG. 7 (e.g., reflective layer 74 may act as a one-way mirror). The presence of reflective material in reflective layer 74 may create undesirable internal reflections (i.e., reflections of internal light 28 back into the interior of vehicle 10). To suppress these reflections, circular polarizer 76 may be formed on the inwardly facing side of reflective layer 74. As shown in FIG. 7, for example, circular polarizer 76 may be interposed between inner glass layer 82 and reflective layer 74. When interior light 28 passes through circular polarizer 76, it become circularly polarized (e.g., with right-hand circular polarization). When the right-hand circularly polarized light (in this example) reflects back towards the interior of vehicle 10 from reflective layer 74, it becomes left-hand circularly polarized and will be prevented from returning to the interior of vehicle 10 by polarizer 76 (e.g., polarizer 76 serves to block interior light reflections from reflective layer 72 and thereby enhances the interior appearance of window 16 to vehicle occupants).

If desired, privacy may be enhanced by illuminating the interior of vehicle 10 with polarized light and incorporating a blocking polarizer in windows 16. As an example, interior light source 27 of FIG. 2 (e.g., a light-emitting diode light source, a lamp, a display, or other interior lighting) may be configured to emit horizontally polarized light (e.g., light 28 that is polarized along the Y axis (or other direction in the XY plane) of FIG. 2. Window 16 may incorporate a linear polarizer (e.g., linear polarizer layer 80 of FIG. 7) that has a pass axis that is oriented along the Z axis. With this configuration, the polarization direction of light 28 is perpendicular to the polarization direction of the linear polarizer, so light 28 will be blocked and thereby prevented from exiting window 16. Because interior lighting is prevented from exiting vehicle 10, privacy is enhanced. If desired, light source 27 may produce circularly polarized light (e.g., right-hand circularly polarized light) and the blocking polarizer in window 16 may be a blocking circular polarizer (e.g., a circular polarizer that blocks right-hand circularly polarized light).

Linear polarizers and/or circular polarizers may be incorporated into window 16 in arrangements having a fixed reflector and/or an adjustable reflector, having a fixed haze layer and/or an adjustable haze layer, having a fixed tint layer and/or an adjustable tint layer, and/or having any other suitable window layers.

The foregoing is merely illustrative and various modifications can be made to the described embodiments. The foregoing embodiments may be implemented individually or in any combination.

What is claimed is:

1. A system, comprising:
control circuitry; and
an adjustable vehicle window adjusted by the control circuitry, wherein the adjustable vehicle window includes an adjustable tint layer that exhibits an adjustable amount of light absorption, wherein the adjustable vehicle window includes an adjustable reflectivity layer selected from the group consisting of: a cholesteric liquid crystal device and a switchable metal hydride film, and wherein the adjustable reflectivity layer exhibits an adjustable amount of light reflectivity.

2. The system defined in claim 1 wherein the adjustable tint layer comprises an electrochromic layer.

3. The system defined in claim 1 wherein the adjustable tint layer comprises a suspended particle device.

4. The system defined in claim 1 wherein the adjustable vehicle window further comprises an adjustable haze layer that is controlled by the control circuitry.

5. The system defined in claim 4 wherein the adjustable haze layer comprises a polymer dispersed liquid crystal layer.

6. The system defined in claim 4 wherein the adjustable haze layer is interposed between the adjustable reflectivity layer and the adjustable tint layer.

7. The system defined in claim 1 wherein the adjustable vehicle window has an outer glass layer and an inner glass layer and wherein the adjustable reflectivity layer and the adjustable tint layer are interposed between the outer glass layer and the inner glass layer.

8. The system defined in claim 7 wherein the adjustable vehicle window has an adjustable haze layer interposed between the outer glass layer and the inner glass layer and includes a polarizer layer.

9. A system, comprising:
control circuitry; and
an adjustable vehicle window adjusted by the control circuitry, wherein the adjustable vehicle window includes an adjustable tint layer that exhibits an adjustable amount of light absorption and includes an adjustable reflectivity layer that exhibits an adjustable amount of light reflectivity, and wherein the adjustable tint layer comprises a guest-host liquid crystal device.

10. A vehicle window that is adjusted using control circuitry, comprising:
a fixed partially reflective mirror layer;
an adjustable haze layer; and
an adjustable tint layer, wherein the adjustable haze layer and the adjustable tint layer are configured to be adjusted independently by the control circuitry.

11. The vehicle window defined in claim 10 further comprising outer and inner glass layers, wherein the adjustable haze layer is interposed between the outer and inner glass layers.

12. The vehicle window defined in claim 11 wherein the adjustable haze layer comprises a polymer dispersed liquid crystal layer.

13. The vehicle window defined in claim 12 wherein the fixed partially reflective mirror layer comprises a metal layer.

14. The vehicle window defined in claim 10 wherein the adjustable tint layer comprises an adjustable tint layer selected from the group consisting of: a guest-host liquid crystal layer, an electrochromic layer, and a suspended particle device.

15. The vehicle window defined in claim 10, wherein the fixed partially reflective mirror layer exhibits a fixed reflectivity.

16. A vehicle having an interior and an exterior, comprising:
a window, wherein the window comprises:
an inner glass layer at the interior of the vehicle,
an outer glass layer at the exterior of the vehicle,
a circular polarizer interposed between the inner and outer glass layers, and
a fixed partially reflective mirror layer interposed between the circular polarizer and the outer glass layer, wherein the circular polarizer is configured to suppress reflections from the fixed partially reflective mirror layer.

17. The vehicle defined in claim 16, wherein the window further comprises an adjustable light modulator layer selected from the group consisting of: a guest-host liquid crystal layer, an electrochromic layer, and a suspended particle device, wherein the adjustable light modulator layer is interposed between the inner and outer glass layers.

* * * * *